Sept. 8, 1936. W. L. BENNINGHOFF 2,054,029
MACHINE FOR CUTTING THREADS
Filed April 10, 1935 5 Sheets-Sheet 1

INVENTOR:
William L. Benninghoff
BY Ray A. Gehr
ATTORNEY

Sept. 8, 1936.  W. L. BENNINGHOFF  2,054,029
MACHINE FOR CUTTING THREADS
Filed April 10, 1935  5 Sheets-Sheet 2

INVENTOR:
William L. Benninghoff
BY Ray S. Grier
ATTORNEY

Sept. 8, 1936. W. L. BENNINGHOFF 2,054,029
MACHINE FOR CUTTING THREADS
Filed April 10, 1935 5 Sheets-Sheet 3
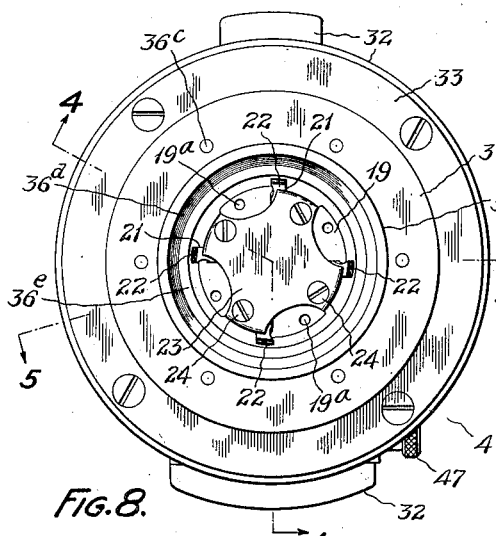
Fig. 8.
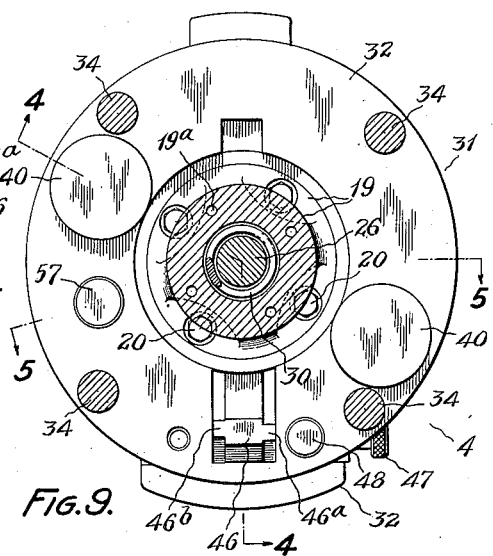
Fig. 9.
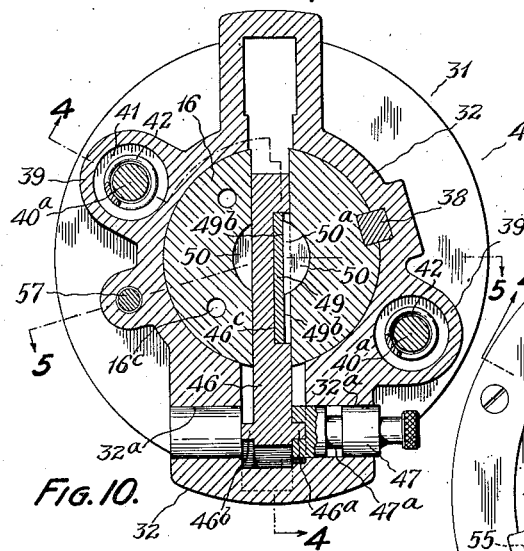
Fig. 10.
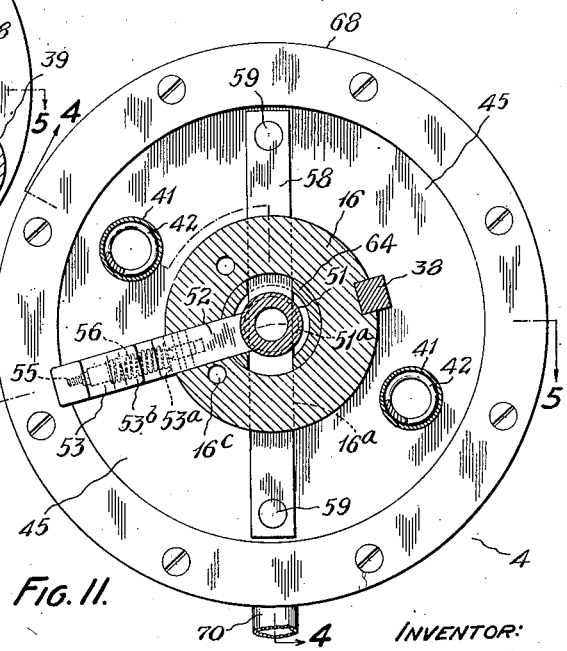
Fig. 11.
Fig. 12.
INVENTOR:
William L. Benninghoff
BY
Ray S. Gehr
ATTORNEY

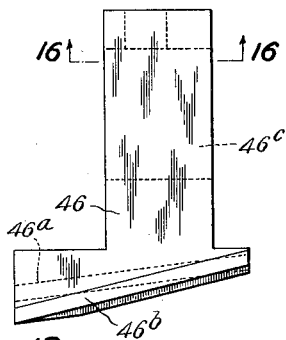
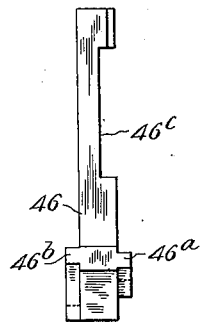
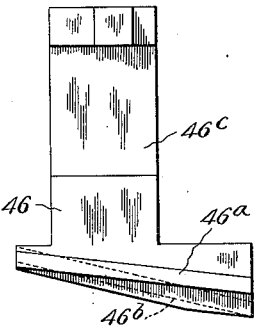
FIG. 13.  FIG. 14.  FIG. 15.
FIG. 16.
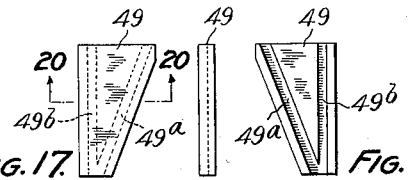
FIG. 17.  FIG. 18.  FIG. 19.
FIG. 20.
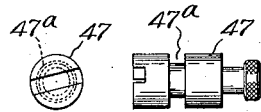
FIG. 26.  FIG. 25.
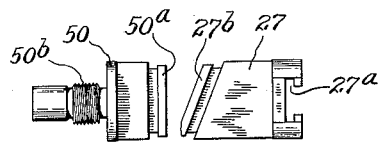
FIG. 21.  FIG. 23.
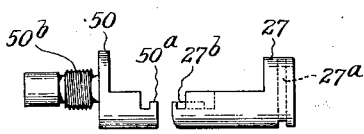
FIG. 22.  FIG. 24.
INVENTOR:
William L. Benninghoff
BY
Ray S. Kuhr
ATTORNEY

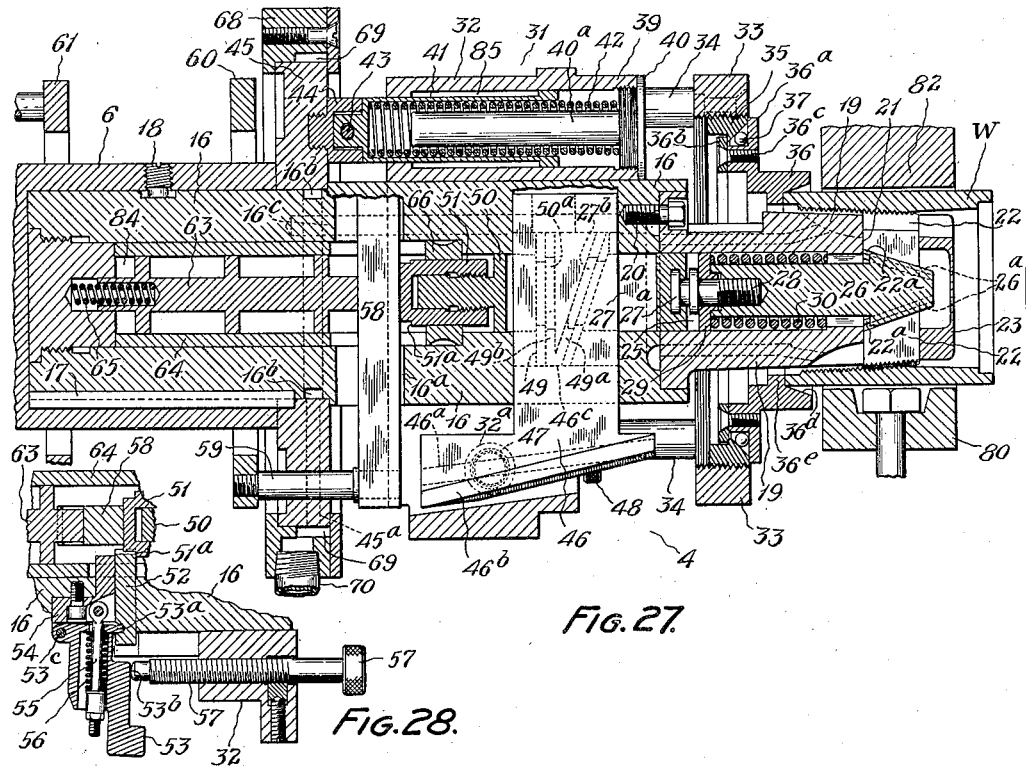
FIG. 27.
FIG. 28.
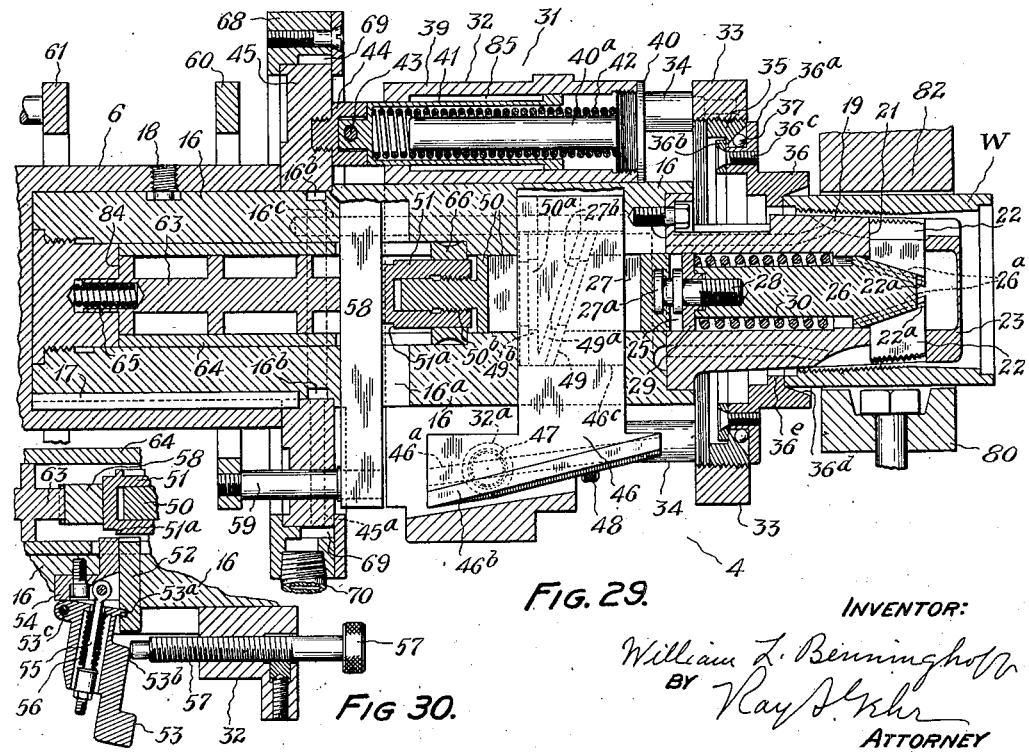
FIG. 29.
FIG. 30.

Patented Sept. 8, 1936

2,054,029

UNITED STATES PATENT OFFICE 2,054,029

MACHINE FOR CUTTING THREADS

William L. Benninghoff, Shaker Heights, Ohio

Application April 10, 1935, Serial No. 15,558

14 Claims. (Cl. 10—145)

The invention relates to thread-forming tools and particularly to tools for cutting taper threads. The invention in certain broader aspects is applicable to the formation of either internal or external threads but some of its features relate particularly to the cutting of internal threads and I shall explain and illustrate the invention as embodied in a tap for threading pipe couplings or other female members.

The objects of the invention comprise: the production of a tool which, both initially and after prolonged use, is adapted to form internal taper threads with a high degree of accuracy; the production of a tool for forming internal taper threads which is readily adjustable or adaptable to form threads of different pitches and tapers and to accommodate work of different sizes; the production of a tool for cutting internal taper threads which operates smoothly, without shock and with reliable uniformity; the provision of a tool of the character stated having improved means for supplying lubricating or cooling fluid to the cutters; and the provision of a threading tool in which there is provision for the automatic centering of the work in relation to the axis of the tool.

Other objects, more or less incidental or ancillary to the objects which have been stated, will appear in the detailed description which follows.

With the stated objects in view, the invention consists in various features of construction and combinations of parts as hereinafter described in connection with the accompanying drawings and defined by the appended claims.

In the drawings, Fig. 1 is a side elevation of a machine embodying the invention, a portion of the chuck which holds the work being shown in vertical section.

Fig. 8 is an enlarged front end view of the cutting mechanism proper.

Fig. 9 is a section on the line 9—9 of Figs. 4 and 5.

Fig. 10 is a section on the broken line 10—10 of Figs. 4 and 5.

Fig. 11 is a section on the broken line 11—11 of Figs. 4 and 5.

Fig. 12 is a section on the line 12—12 of Figs. 4 and 5.

Figs. 13, 14, and 15 are, respectively, enlarged front side, edge, and rear side elevations of one of the parts of the mechanism.

Fig. 16 is a section on the line 16—16 of Fig. 13.

Figs. 17, 18, and 19 are, respectively, enlarged front side, edge, and rear side elevations of a cam member which cooperates with the part shown in Figs. 13–16.

Fig. 20 is a section on the line 20—20 of Fig. 17.

Figs. 21 and 22 are, respectively, enlarged front side and plan views of a part of the mechanism.

Figs. 23 and 24 are corresponding views of another part of the mechanism.

Figs. 25 and 26 are, respectively, side and end views of a cylindrical cam member of the mechanism.

Figure 1:
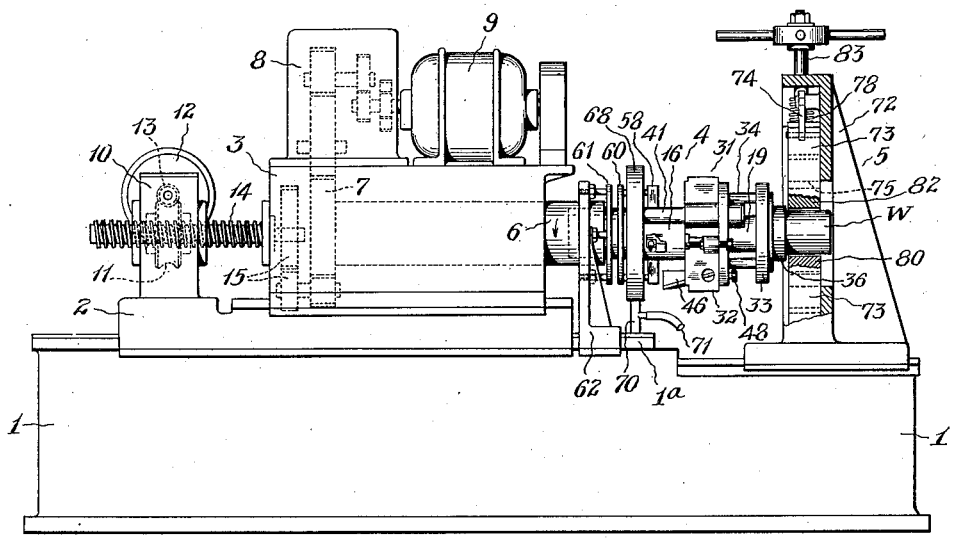
Figures 2, 3:
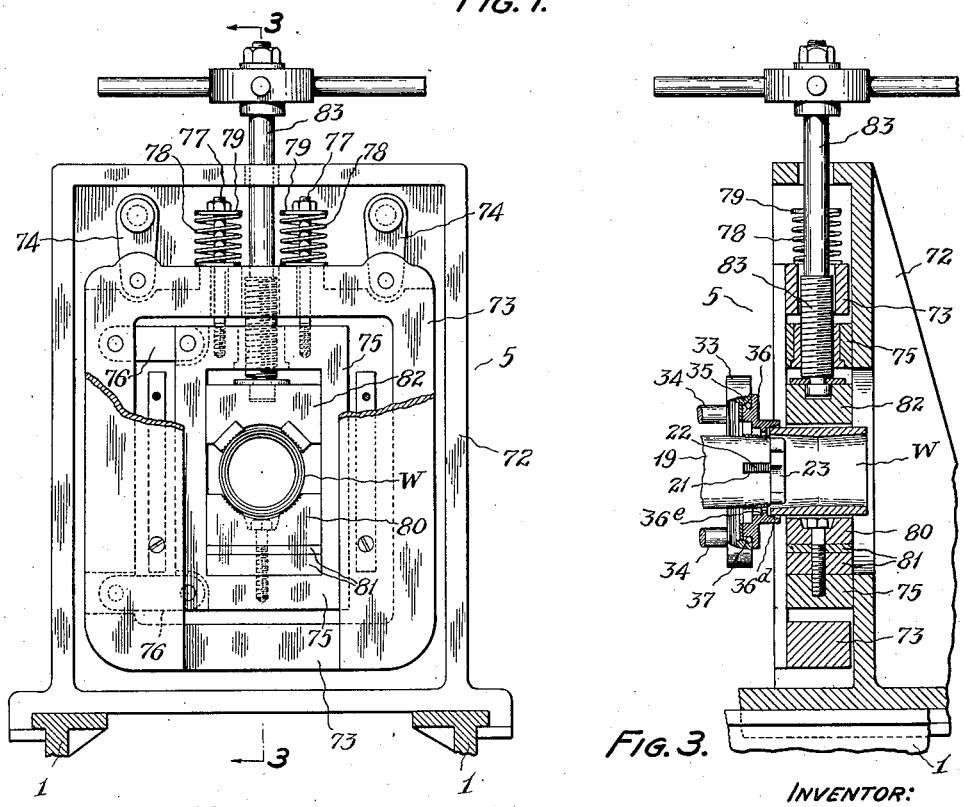
Fig. 2 is an enlarged front elevation of the chuck with portions broken away to better disclose the construction.
Fig. 3 is an enlarged vertical section of the chuck and some of the adjacent parts of the thread-cutting mechanism, the section being taken on the line 3—3 of Fig. 2.
Figure 4:
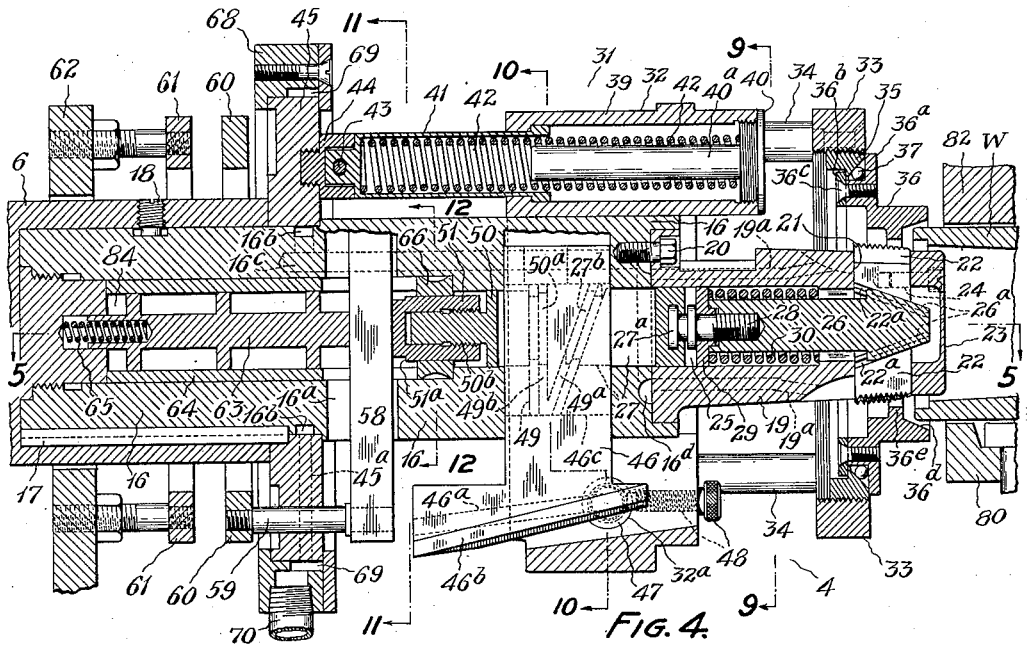
Fig. 4 is an enlarged vertical section through the threading tool proper, the section being taken on the line 4—4 of Figs. 5 and 8 to 12 and the parts of the mechanism being shown in the positions occupied when a threading operation is about to be started.

Fig. 27 is a view similar to Fig. 4 but with the parts of the mechanism in the positions occupied at the end of the thread-cutting operation just before the cutters are retracted away from the work.

Fig. 28 is a corresponding fragmentary view of the latch mechanism showing the position of the parts when the latch is about to be disengaged.

Figs. 29 and 30 are views similar to Figs. 27 and 28, respectively, but with the parts of the mechanism shown in the positions which they occupy after the disengagement of the latch and the retraction of the cutters away from the work.

Referring now in detail to the construction illustrated, 1 is the main bed frame of the machine, 2 is a sub-frame slidably adjustable on the bed frame 1 lengthwise thereof and 3 designates as an entirety the head frame or carriage which carries the thread-forming mechanism and most of the drive mechanism therefor, the frame 3 being slidably mounted on the frame 2 to move endwise thereof during the thread-cutting operation. 4 indicates the thread-cutting mechanism in its entirety and 5 indicates as an entirety the chuck for holding the work W which, as shown, is in the form of a pipe coupling.

The thread-forming mechanism 4 is carried by a rotary spindle 6 which is mounted in bearings (not shown) in the frame 3. The spindle 6 carries a gear 7 at its rear end which is driven through a train of gears in the box 8 by an electric motor 9. On the rear end of the sub-frame 2 is a casing 10 in which is rotatably mounted a worm wheel 11 and on which is supported an electric motor 12 which drives a worm 13 that meshes with and drives the wheel 11. The worm wheel 11 is threaded to receive a large screw 14 which is adapted to be driven by a train of gears 15 from the gear 7 of spindle 6. By driving the worm wheel 11 from motor 12 when the screw 14 is not rotated, the carriage 3 can be rapidly advanced or retracted on frame 2 in relation to the work, and when the worm wheel 11 is stationary and the screw 14 is driven from the motor 9, the carriage 3 is more slowly fed forward during the thread-cutting operation.

Referring now to the thread-forming tool or mechanism, said tool comprises a chambered body 16, the rear end of which is supported in a socket in the front end of the spindle 6 as shown in Fig. 4, the tool body being secured against rotation in the spindle by a key 17 and against withdrawal from the spindle by a screw 18. At its front end the tool body 16 has a detachable head portion 19 which is secured to the main body part 16 by machine screws 20. The head 19 is formed at its front end with a series of nearly radial slots 21 (Fig. 8) in each of which is slidably mounted a cutter or chaser 22. The sides of the said slots engage and guide the cutters on three sides and on their front sides they are engaged and guided by a plate 23 which is secured to the head by screws 24.

In the operation of the tool the cutters are gradually retracted inward away from the work to cut the thread in taper form, and at the end of the cutting operation proper the cutters are further rapidly retracted from engagement with the work. I shall now describe my novel mechanism for effecting these gradual and rapid movements of the cutters.

Within the axial bore of the body structure 16, 19 is a slide designated as an entirety by the numeral 25. For convenience of manufacture and assembly this slide is made to comprise a front member 26 and a rear member 27 which are swiveled together by means of a screw 28 which is secured to the front member 26 with an intervening washer 29. The head of the screw is grooved to engage the undercut slot 27a of the rear member 27. A heavy coiled spring 30 which is interposed between the washer 29 and an inwardly turned shoulder of the head 19 serves to yieldingly press the slide structure rearward. The front end of member 26 is tapered and formed with slots and laterally or peripherally extending tongues 26a adapted to fit in correspondingly tapered or inclined cam grooves 22a in the sides of the chasers 22. With this construction endwise movement of the slide 25 effects outward or inward movement of the chasers 22.

To cause a suitable relative movement of the slide 25 and the tool body 16, 19 the following means are provided. On the outer cylindrical surface of the body 16 is mounted an annular slide which is designated in its entirety by 31. This slide comprises a main section 32 (Figs. 4, 5, and 10) which slidably engages the body 16, a front ring section 33 which is carried from the section 32 by a series of pins 34, 34, an annular bearing member 35 which is threaded into the ring 33 for axial adjustment therein and which is held in adjusted position by friction or, if desired by a mechanical detent (not shown), and a front work-engaging collar 36. Said collar has a flange 36a to engage the front side of the ring 35 and a detachable ring 36b secured by screws 36c to engage a rearwardly facing shoulder of the ring 35 so that the collar 36 can rotate in relation to the ring 35, frictional resistance to such rotation being minimized by interposed bearing balls 37. The collar 36 is formed with a rearwardly tapering internal surface 36d which terminates at an inwardly extending flange 36e, the taper surface 36d being adapted to engage the outer edge of the end of the coupling to be threaded and guide it to a central position as the collar and coupling come together. The main slide member 32 is held against rotation on the tool body 16 by a key 38 (Fig. 10). The slide 32 is formed with two diametrically opposite longitudinally extending bosses 39, 39 which have tubular bores closed at their front ends by screw caps 40, 40. Slidably mounted in the bores of the bosses 39 are tubular guides 41, 41 for long coil springs 42, 42, the front ends of which engage the screw caps 40 while the rear ends engage the closed rear ends of the guides 41. The caps 40 carry rearwardly extending pins 40a to prevent buckling of the springs 42. The rear ends of the tubes 41 have loose connections by means of pins 43 with sockets 44 which are screwed into an annular plate 45 which is rigidly fixed on the tool body 16.

The springs 42 serve to press the slide 31 forward on the tool body, as shown in Fig. 4, to maintain the collar 36 in engagement with the work when the tool body is fed forward during the threading operation, and during such operation the slide 31 is caused to move relatively rearward with resultant compression of the springs 42.

Figure 5:
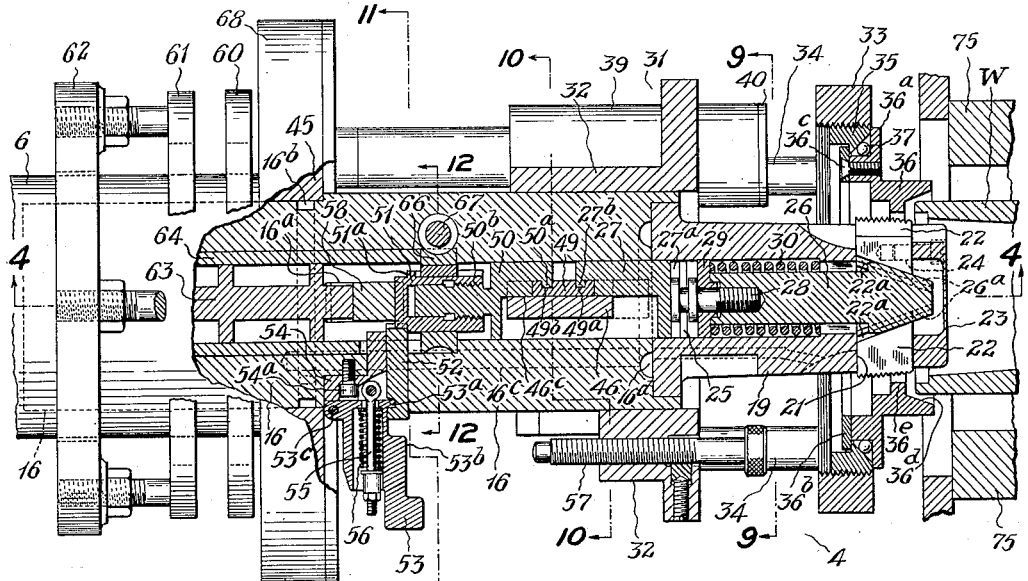
Fig. 5 is an enlarged plan view of the cutting mechanism proper with some of the parts shown in section on the line 5—5 of Figs. 4 and 8 to 12 and the various parts being shown in the same positions as in Fig. 4.

The relative movement of the outer slide on the tool body is transmitted to the inner slide 26, 27 through operative connections between the two slides comprising a vertically disposed bar or plate member 46 which slidably fits in a rectangular slot extending transversely through the tool body 16 (Figs. 4, 5, and 10). The transversely slidable member 46 is roughly L-shaped, as seen in side elevation in Fig. 13, and on the two sides of its lower end it is formed with inclined cams 46a and 46b, the latter cam being more sharply inclined than the former. At its lower side the slide member 32 is formed with cylindrical apertures 32a, either of which is adapted to receive a cylindrical cam follower 47, the end of which is formed with a slot to engage the cam 46a, or 46b, as the case may be. The cam follower 47 is removably secured in position by a screw 48, the end of which projects into an annular groove 47a of the cam member 47, thus preventing endwise movement of the member 47 without preventing its rotation to fully accommodate its cam slot to either of the cams 46a, 46b.

The rear face of the transverse member 46 is recessed at 46c and in this recess is slidably fitted a cam plate 49 which is formed on its rear face with an inclined cam groove 49a which is adapted to cooperate with a cam tongue 27b on the rear end of the inner slide member 27. The plate 49 also is formed with a vertical groove 49b which is adapted to cooperate with a plunger 50 having a tongue 50a to engage the vertical groove 49b. The plunger 50 is slidable in the axial bore of the tool body 16 but when it is held against such sliding movement it holds the cam plate 49 against movement parallel to the axis of the tool but at the same time permits the cam plate to move upward and downward with the plate 46. Such upward or downward movement of the cam plate 49, it will be seen, causes lengthwise movement of the inner slide structure 25 and by suitable design of the cam connections between the outer slide and the transverse plate 46 and between the latter and the inner slide 25 and between the latter and the cutters 22, said cutters may be gradually retracted inward as the tool body advances axially in relation to the work at a rate suitable to form the threads with the desired taper.

To provide for the rapid additional retraction or collapse of the cutters at the end of the thread-cutting operation proper, I provide the following means for controlling the position of the plunger 50 and the cam plate 49 lengthwise of the tool body 16. The plunger 50 (Figs. 5, 21, and 22) is formed with a rearward threaded extension 50b on which is adjustably mounted a cylindrical latch abutment 51, the rear end of which is reduced in diameter to form an annular shoulder 51a adapted to cooperate with the inner end of a slidably mounted latch bolt 52. When the bolt 52 is in a position shown in Fig. 5 it engages the shoulder 51a and prevents rearward movement of plunger 50 and cam plate 49. If the bolt 52 is withdrawn outward, plunger 50 is released and the tension of spring 30 is permitted to force the inner slide 25, cam plate 49 and plunger 50 rearward to effect rapid inward retraction of the cutters 22. The latch bolt 52 is operated automatically to disengage the latch at the end of the thread-cutting operation by the lever 53 which has a tooth 53a engaging a notch in the bolt 52 and which is itself actuated by screw 57 adjustably mounted in the slide member 32 in position to engage the cam surface 53b of the lever near the end of the forward movement of the tool body. Said lever 53 is pivotally mounted at 53c on a block 54 secured by a screw 54a to the tool body 16. To normally hold the latch 52 in its inner, operative position in engagement with abutment 51, the lever 53 is formed with a cavity to accommodate an eyebolt 55 pivotally connected to block 54 and a coil spring 56 interposed between the lever and the nut of the bolt so as to cause counter-clockwise movement of the lever.

To provide for the resetting of the cam 49 and the plunger 50 after the rapid retraction of the cutters, a transverse bar 58 is slidably mounted in slots 16a, 16a in the tool body 16, such bar being carried on pins 59, 59 which are slidably mounted in the annular plate 45. A ring 60 is mounted on the rear ends of the pins 59 in position to engage a similar ring 61 which is carried on an upright frame 62 which is adjustably mounted on the main frame 1. When the tool body is retracted to withdraw the cutters from the work after the completion of the threading operation the ring 60 is brought into engagement with the stationary ring 61 whereupon further retraction of the tool body causes relatively forward movement of the bar 58 which in turn moves the plunger structure 50, 51 and the cam 49 forward in the bore of the tool body. The resetting bar 58 is maintained constantly in contact with the latch abutment 51 by a plunger 63 which is slidably mounted in a sleeve 64 in the axial bore of the tool body 16 and is constantly pressed against the bar 58 by a coil spring 65. The sleeve 64 has its front end slotted to accommodate the bar 58.

To permit the adjustment of the position of the inner slide 25 in relation to the position of the outer slide 31, I provide means for manually adjusting the latch abutment 51 on the plunger 50. To this end a worm wheel 66 is slidably keyed on the abutment member 51 and is engaged by a worm 67, the end of which is provided with a wrench socket 67a by which the worm can be turned to turn the worm wheel and thus adjust the latch abutment 51 axially in relation to the plunger 50. By this means the position of the inner slide 25 can be adjusted forward and backward in relation to the outer slide.

It will be observed that the outer slide structure 31, the inner slide structure 25 and the parts operatively connecting the two slides constitute a train of parts between the work and the chasers which have mutually engaging cam surfaces that are at all times in mutual engagement throughout substantial areas and by their relative movement effect the inward and outward movement of the chasers. Also it will be seen that the plunger 50 and the latch abutment 51 together constitute a working abutment for the cam plate 49.

To provide for the supply of lubricating or cooling fluid to the cutters I mount on the outer periphery of the plate 45 a ring 68 which is formed to provide an annular passage or channel 69 around the outer periphery of the plate. A nice sliding fit between the plate 45 and the ring 68 permits relative rotational movement of the two members. At the bottom of the ring 68 it is fitted with a section of pipe 70 which has its lower end (not shown) closed and disposed between guides 1a extending lengthwise of the bed plate 1 so as to prevent rotation of the ring 68 with the tool body 16. A flexible section of hose 71 is connected to the pipe 70 and may lead to any suitable source of supply of lubricant or cooling fluid. From the channel 69 lubricant is conducted through passages 45a in plate 45 and annular passage 16b formed in tool body 16. The passage 16b in turn communicates with a longitudinal passage 16c leading to an annular passage 16d at the front end of tool body 16, the latter annular passage communicating in turn with longitudinal passages 19a in the cutter head 19 from the front end of which passages the lubricant is discharged upon the cutters.

The chuck 5 may be constructed in any suitable manner providing for a limited movement of its work-supporting jaws in any direction in a plane at right angles to the axis of the threading tool. In the drawings I have illustrated the type of chuck construction disclosed in U. S. Patent No. 1,967,507. The construction comprises an upright frame 72 which is slidably mounted upon the bed frame 1 to provide for some adjustment of the chuck in relation to the threading tool. A rectangular frame 73 is supported from frame 5 by depending links 74, 74 which provide for lateral movement of frame 73. Within the frame 73 is disposed a smaller rectangular frame 75 which is attached to frame 73 by horizontally disposed links 76, 76. To provide for yieldingly suspending the inner frame 75 from the outer frame 73 the frame 75 is fitted with a pair of bolts 77, 77 which extend upward through apertures in frame 73 and are surrounded by coil springs 78, 78 which are interposed between the upper side of frame 73 and washers 79, 79 on bolts 77. In frame 75 is mounted a bottom work-engaging jaw 80 which is normally fixed but can be adjusted up or down in relation to frame 75 by the use of shims or blocks 81. An upper work-engaging jaw 82 is slidably mounted in frame 75 and can be moved up and down by means of hand screw 83 which has threaded engagement with frame 75 and passes loosely through apertures in frames 73 and 72.

With the construction such as that illustrated it will be seen that the work-engaging jaws 80, 82 are firmly held from rotation relative to the axis of the threading tool but are permitted to have a limited movement in any direction in the plane of the chuck. This floating support for the work-engaging jaws af the chuck permits the necessary lateral movement of the work under the influence of the work-engaging member 36 of the outer slide of the threading tool to insure the proper centering of the work in relation to the axis of the threading tool.

In operating the machine, the sub-frame 2, supporting frame 62 of ring 61, and frame 72 of the chuck 5 are first adjusted to suitable relative positions on bed frame 1, according to the character of the work to be threaded. Next, the threading tool is set or adjusted in accordance with the diameter of the work to be threaded, in accordance with the depth of its counter-bore and in accordance with the taper and length of the threads to be formed. With the outer slide 31 moved forward and the cam holding plunger 50 latched in its forward position, as shown in Fig. 5, the first of the four tool adjustments referred to is effected by turning the worm 67 to adjust the plunger 50 and the inner slide 25 forward or backward, as the case may be, so that the cutters when in their innermost position will be suitably disposed to start the cut. To accommodate pipe couplings having counter-bores of different depths, the ring 35 is adjusted forward or backward in the member 33 of the outer slide 31. The adjustment of the tool for the taper of the threads is effected by placing the cylindrical cam member 47 in engagement with one or the other of the cams 46a, 46b of the transverse sliding bar 46; or, if a still different taper is desired, a different bar or plate 46 having cams of still different inclinations may be substituted in the tool, as will readily be understood. Finally, adjustment for the length of the thread to be formed is effected by adjusting the screw 57 in the outer slide 31.

Assuming that the work to be threaded is a pipe coupling such as illustrated in the drawings, the coupling is first secured in the chuck and, with the threading tool proper set for the beginning of a threading cut as shown in Figs. 4 and 5, the motor 9 is started to rotate the spindle 6 and at the same time slowly feed carriage 3 forward to the work. As the inner flange 36e of the member 36 approaches the end of the coupling W the latter is engaged by the tapered or conical surface 36d of member 36 and is thereby centered in relation to the axis of the tap. This is an important feature since it insures uniform depth of cut for the chasers at all times, thus favoring accuracy of the work performed by the chasers. After the work is engaged by slide member 36 it is also engaged by the chasers and as the tool body is fed forward the outer slide 31 moves backward thereon thereby compressing springs 42 and through the cylindrical cam 47 moving the transverse plate 46 upward. The plate 46 carries with it the cam plate 49 and the upward movement of said cam permits the heavy coil spring 30 to correspondingly move the inner slide 25 rearward, the cam plate 49 itself being prevented from moving rearward by its engagement with plunger 50 which is held by the latch 52. The gradual rearward movement of the inner slide, through its cam connections 26a, 22a with the chasers, effects the gradual inward retraction of the latter as they advance axially in relation to the work with resultant taper of the thread formed. The thread-cutting operation effected in this manner continues until the thread of desired length is nearly completed whereupon the stop screw 57 engages the cam surface of lever 53 and starts the disengagement of latch 52 from the abutment member 51. In Figs. 27 and 28 such disengagement of the latch is shown nearly completed and the chasers are correspondingly approximately at the end of their cutting operation and have been correspondingly retracted inward to effect the taper cut, as will be seen from a comparison of Figs. 4 and 27. With a slight increase in the feeding movement of the tool the parts are brought to the positions shown in Fig. 29 whereupon as the latch 52 is disengaged from the abutment 51 the plunger 50 and cam 49 are freed and are permitted to move rapidly rearward with the inner slide 25 under the pressure of coil spring 30. This rapid movement of the inner slide effects the rapid collapse of the chasers to the positions shown in Fig. 29 of the drawings. The rearward movement of the inner slide and the associated parts 49, 50, and 51 carries with these parts the transverse bar 58 and the ring 60 from their positions shown in Figs. 4, 5, and 27 to the position shown in Fig. 29.

To check the sudden rearward movement of the inner slide and associated parts and avoid objectionable shock the plunger 63 is given a nice fit in the sleeve 64 and the air trapped in the space 84 serves by its gradual escape to effectively cushion the movement of the said parts. With the cutters or chasers collapsed the operator stops the motor 9 and starts motor 12 to effect rapid withdrawal of the cutters from the work. During this withdrawal the coil springs 42 effect the forward movement of the slide 31 on the tool body until it again reaches the relative position indicated in Fig. 4. Any shock incident to the stopping of the forward movement of the slide 31 on the tool body is avoided by the cushioning action of air enclosed in the annular space 85 (Fig. 27) between the parts. After the outer slide is fully advanced on the tool body further retraction of the latter withdraws the work-engaging member 36 from engagement with the work.

Toward the end of the retraction of the tool body the resetting ring 60 comes into engagement with the fixed ring or stop 61 whereupon the bar 58 is moved forward in relation to the tool body together with the parts 51, 50, 49 and 25. As soon as the part 51 is thus moved forward the latch 52 is permitted to be moved inward to operative position by lever 53 under the action of the coil spring 56. The reverse feed is then stopped and the coupling being threaded can be reversed in the chuck for the threading of its other end. Thereupon the drive motor 9 may again be started to advance the tool to the work with a repetition of the movements and operations above described. In Figures 4 and 5 the parts of the threading tool are shown in the positions occupied shortly after the forward feed of the tool body has been started, the resetting ring 60 having moved forward a little distance from the fixed stop 61.

If it is desired to collapse the chasers at any time during the thread-cutting operation, it can readily be accomplished by the operator by manual actuation of the lever 53. Also the collapsed chasers can be re-expanded or re-set by manually moving the bar 58 or the ring 60.

It will be observed that in my improved tool the latch member which is disengaged to permit rapid retraction of the chasers at the end of the threading operation is not an integral part of or rigid with any one of the train of parts constituting the operative connection between the chasers and the work-engaging member carried by the outer slide. Distinct advantages flow from this novel feature of the construction. One advantage is that the cooperating cam surfaces of the connections (a) between the chasers and the inner slide, (b) between the inner slide and the transverse plate, and (c) between the transverse plate and the outer slide which carries the work-engaging member, are at all times firmly maintained in mutual contact over substantial areas by pressure of the springs 30, 42 and 65 so that dirt cannot enter between said surfaces and so that the wear of said surfaces is minimized. Since the taper of the threads cut is determined by the cam surfaces referred to I avoid the inaccurate formation of the threads that would result from the entry of dirt or foreign substances between the cam surfaces and from very extensive wear of said surfaces or parts thereof such as prior forms of constructions known to me have been subject to. In such prior constructions the rapid collapse of the chasers is effected by disengagement from an abutment of some one of the members constituting the operative connection between the chasers and the work-engaging part. In such constructions the movement of the disengageable member over its abutment is necessarily coextensive with the gradual retraction of the chasers from the beginning to the end of the thread-cutting operation and since the overlapping areas of the disengageable member and its abutment in the latter part of this movement are small the resulting heavy wear between the surfaces unavoidably affects the taper of a considerable portion of the thread formed, rendering it inaccurate to a highly objectionable extent. With my improved type of construction, while the disengageable latch is moved as a result of the relative movement between the work-engaging slide and the tool body the designer is free to make the rate of movement of the latch independent of the rate of relative movement between the work-engaging slide and the tool body, as by control of the shape and mounting of the cam lever 53, and is also able to limit the movement of the disengageable latch to a small part of the relative movement between the work-engaging slide and the tool body, as by the provision of large lost motion between the lever 53 and its actuating screw 57. Thus with my improved construction the wear between the surfaces of the disengageable latch and its abutment affects the pitch of the thread only for a very small part thereof at the end of the thread-cutting operation and is unimportant. Consequently with my improved construction I am enabled to produce threads that are highly accurate and with minimum effects due to wear after prolonged use of the tool.

Figures 6, 7:
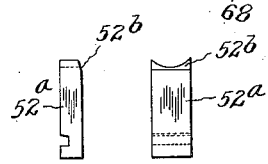
Figs. 6 and 7 are, respectively, edge and face elevations of a modified form of the latch bolt of the tool.

Another advantage incident to the improved construction is found in the possibility of modifying in a predetermined manner the pitch of the thread during the latter part only of the thread-forming operation. This can readily be accomplished by using the modified form of disengageable latch shown in Figs. 6 and 7. Here the latch 52a is formed in every respect like the latch 52 in the construction already described except that the front side of the latch is formed with a beveled cam surface 52b where it engages the coacting surface of abutment 51, the effect of which is to definitely modify the taper of the latter part of the thread after lever 53 is engaged by its operating screw 57. A predetermined modification of the taper in this manner is effected by suitably determining the form of the cam surface 52b.

As has been stated, the tool is adapted to couplings to be threaded according to the depth of their counterbores by axial adjustment of the ring 35 and the work-engaging collar 36. This adjustment, of course, is effected without affecting or disturbing the adjustment of the cutters for diameter and the advantage of this will be apparent when it is observed that the nominal diameters of taper threaded pipe couplings is determined by the diameter at the entering end of the thread. Consequently when my improved tool has been adjusted for couplings of a given diameter (by means of the worm and wheel devices 66, 67) this adjustment is not disturbed by the adjustment necessary to accommodate counterbores of different depths.

Similarly it will be observed that the adjustment of the cutters for pipe couplings of a given diameter is not disturbed by the adjustment (effected by adjustment of screw 57) to provide threads of different lengths.

It is believed that the manner in which other noted objects of the invention are attained by the construction described will be apparent from the foregoing description without further comment.

The apparatus constituting the subject of the present application has much in common with the apparatus disclosed in my copending application Serial No. 743,801, filed September 13, 1934, in which such common matters are claimed.

In the carrying out of my invention its various features can be embodied in structures differing more or less widely from the structures shown and described, as will be apparent from the appended claims which define the scope of the invention.

What I claim is:

1. In a tool for forming taper threads, the combination of a chambered tool body; means, comprising a cutter movably mounted on the body, for cutting a thread when the tool body and the work to be threaded are given relative rotational and axial movements; slides mounted on the tool body, one inside thereof and the other outside thereof, and one being adapted to engage the work and be held against axial movement relative to the work during the thread-cutting operation and the other being adapted to have such movement; a cam connection between the slide last referred to and the cutter to provide for movement of the cutter relative to the work when the said slide moves relative to the tool body; means for operatively connecting the inner and outer slides comprising a part mounted for movement transversely of the tool body, a cam connection between the work-engaging slide and the transversely movable part, and an operative connection between the said part and the other slide comprising a cam member mounted to move with the transversely movable part transversely of the tool body and to move relative to the transversely movable part parallel to the tool body axis; means comprising a spring tending to move the said cam member in one direction parallel to the tool body axis;

and means comprising a disengageable latch adapted to hold the said cam member against such movement and when said latch is disengaged to permit such movement.

2. In a tool for forming taper threads, the combination of a chambered tool body; means, comprising a cutter movably mounted on the body, for cutting a thread when the tool body and the work to be threaded are given relative rotational and axial movements; a slide mounted on the outer side of the tool body adapted to be held against axial movement relative to the work during the thread-cutting operation; a slide mounted in the tool body; a cam connection between the inner slide and the cutter to provide for movement of the cutter relative to the work when the said slide moves relative to the tool body; means for movably connecting the inner and outer slides comprising a part mounted for movement transversely of the tool body; a cam connection between the outer slide and the transversely movable part, and an operative connection between the said part and the inner slide comprising a cam member mounted to move with the transversely movable part transversely of the tool body and to move relative to the transversely movable part parallel to the tool body axis; means comprising a spring tending to move the said cam member in one direction parallel to the tool body axis; and means comprising a disengageable latch adapted to hold the said cam member against such movement and when said latch is disengaged to permit such movement.

3. In a tool for forming taper threads, the combination of a tool body; means, comprising a cutter movably mounted on the body, for cutting a thread when the tool body and the work to be threaded are given relative rotational and axial movements; and means movably supported on the tool body and operable by relative axial movement of the said body and the work gradually to retract the cutter relative to the work during the thread-cutting operation and rapidly to retract the cutter further at the end of the cutting operation, said means comprising slides mounted on the tool body for movement parallel to the axis thereof, one slide being adapted to engage the work and be held against axial movement relative to the work during the thread-cutting operation and the other being adapted to have such movement, a cam connection between the slide last referred to and the cutter to provide for movement of the cutter relative to the work when the said slide moves relative to the tool body, a part mounted for movement transversely of the tool body, a cam connection between the work-engaging slide and the transversely movable part and a cam connection between the latter part and the other slide comprising a cam member mounted to move with the transversely movable part transversely of the tool body and to move relative to the transversely movable part parallel to the tool body axis, all of the said cam connections between the cutter and the work-engaging slide having coacting cam surfaces continuously maintained in mutual engagement over substantial areas throughout the gradual and rapid retractions of the cutter; means comprising a spring tending to move the said cam member in one direction parallel to the tool body axis; means comprising a disengageable latch adapted to hold the said cam member against such movement; and means operable at the end of the thread-cutting movement of the tool to disengage the latch and, by the resulting rapid movement of the said cam member, effect the aforesaid rapid retraction of the cutter.

4. In a tool for forming taper threads, the combination of a tool body; means, comprising a cutter movably mounted on the body, for cutting a thread when the tool body and the work to be threaded are given relative rotational and axial movements; and means movably supported on the tool body and operable by relative axial movement of the said body and the work gradually to retract the cutter relative to the work during the thread-cutting operation, said means comprising a slide mounted for movement on the body parallel to the axis thereof and a work-engaging part rotatably mounted on the slide and having an axially tapered surface to engage the work and center it in relation to the axis of the tool.

5. In a tool for forming taper threads, the combination of a tool body; means, comprising a cutter movably mounted on the body, for cutting a thread when the tool body and the work to be threaded are given relative rotational and axial movements; and means movably supported on the tool body and operable by relative axial movement of the said body and the work gradually to retract the cutter relative to the work during the thread-cutting operation, said means comprising a slide mounted for movement on the body parallel to the axis thereof and a work-engaging part rotatably mounted on the slide and having an axially tapered surface to engage the work; and a chuck for holding the work having its work-engaging parts movable in all directions in a plane at right angles to the axis of the tool to permit the said axially-tapered surface to center the work in relation to the axis of the tool.

6. In a tool for forming taper female threads, the combination of a tool body; means, comprising a cutter movably mounted on the body, for cutting a thread when the tool body and the work to be threaded are given relative rotational and axial movements; and means supported on the tool body and operable by relative axial movement of the said body and the work gradually to retract the cutter relative to the work during the thread-cutting operation, said means comprising a slide mounted for movement on the body parallel to the axis thereof, a structure adjustable on the slide on lines parallel to said axis, and a work-engaging member mounted on said adjustable structure for rotation about said axis.

7. In a tool for forming taper threads, the combination of a chambered tool body; means, comprising a cutter movably mounted on the body, for cutting a thread when the tool body and the work to be threaded are given relative rotational and axial movements; slides mounted on the tool body, one inside thereof and the other outside thereof, and one being adapted to engage the work and be held against axial movement relative to the work during the thread-cutting operation and the other being adapted to have such movement; a cam connection between the slide last referred to and the cutter to provide for movement of the cutter relative to the work when the said slide moves relative to the tool body; means for operatively connecting the inner and outer slides comprising a part mounted for movement transversely of the tool body, a cam connection between the work-engaging slide and the transversely movable part, and an operative connection between the said part and the other slide comprising a cam member mounted to move with the transversely movable part transversely of the tool body and to move relative to the transversely movable part parallel to the tool body axis; means comprising a spring tending to move the said cam member in one direction parallel to the tool body axis; and means for holding the said cam member against such movement during the thread-cutting operation, said means comprising a disengageable latch adapted when engaged to hold the cam member against the said spring and when disengaged to permit the spring to move the cam member; and manually adjustable means interposed between the latch and cam member for varying the position of the cam member in which it is held when the latch is engaged.

8. In a tool for forming taper threads, the combination of a tool body; means, comprising a cutter movably mounted on the body, for cutting a thread when the tool body and the work to be threaded are given relative rotational and axial movements; slides mounted on the tool body, one being adapted to engage the work and be held against axial movement relative to the work during the thread-cutting operation and the other being adapted to have such movement; a cam connection between the slide last referred to and the cutter to provide for movement of the cutter relative to the work when the said slide moves relative to the tool body; means for operatively connecting the two slides comprising a movable connecting part adapted when moved in one direction to transmit relative movement between the work-engaging slide and the tool body to the other slide to effect gradual retraction of the cutter during the thread-cutting operation and adapted by movement in another direction at the end of the thread-cutting operation to retract the cutter from engagement with the work; means comprising a spring for causing the last mentioned movement of the connecting part; means comprising a disengageable latch adapted when engaged to prevent such movement of the connecting part by the spring and when disengaged to permit such movement; and means for disengaging the latch comprising a part mounted on the work-engaging slide, said means being adjustable and adapted by its adjustment to vary the amount of the relative movement between the work-engaging slide and the tool body occurring during the thread-cutting operation before disengagement of the latch.

9. In a tool for forming taper threads, the combination of a tool body; means, comprising a cutter movably mounted on the body, for cutting a thread when the tool body and the work to be threaded are given relative rotational and axial movements; slides mounted on the tool body, one being adapted to engage the work and be held against axial movement relative to the work during the thread-cutting operation and the other being adapted to have such movement; a cam connection between the slide last referred to and the cutter to provide for movement of the cutter relative to the work when the said slide moves relative to the tool body; means for operatively connecting the two slides comprising a movable connecting part adapted when moved in one direction to transmit relative movement between the work-engaging slide and the tool body to the other slide to effect gradual retraction of the cutter during the thread-cutting operation and adapted by movement in another direction at the end of the thread-cutting operation to retract the cutter from engagement with the work; means comprising a spring for causing the last mentioned movement of the connecting part; means comprising a disengageable latch adapted when engaged to prevent such movement of the connecting part by the spring and when disengaged to permit such movement; and means for disengaging the latch comprising a part adjustably mounted on the work-engaging slide and adapted by its adjustment to vary the amount of the relative movement between the work-engaging slide and the tool body occurring during the thread-cutting operation before disengagement of the latch.

10. In a tool for forming taper threads, the combination of a tool body; means, comprising a cutter movably mounted on the body, for cutting a thread when the tool body and the work to be threaded are given relative rotational and axial movements; slides mounted on the tool body, one being adapted to engage the work and be held against axial movement relative to the work during the thread-cutting operation and the other being adapted to have such movement; a cam connection between the slide last referred to and the cutter to provide for movement of the cutter relative to the work when the said slide moves relative to the tool body; means for operatively connecting the two slides comprising a movable connecting part adapted when moved in one direction to transmit relative movement between the work-engaging slide and the tool body to the other slide to effect gradual retraction of the cutter during the thread-cutting operation and adapted by movement in another direction at the end of the thread-cutting operation to retract the cutter from engagement with the work; means comprising a spring for causing the last mentioned movement of the connecting part; means comprising a disengageable latch adapted when engaged to prevent such movement of the connecting part by the spring and when disengaged to permit such movement; and means for disengaging the latch comprising a part associated with the latch and a part carried by the work-engaging slide and adapted to engage the other part near the end of the thread-cutting movement to effect disengagement of the latch, one of the two latch-actuating parts being adjustably mounted and adapted by its adjustment to vary the amount of relative movement between the work-engaging slide and the tool body during the thread-cutting operation prior to disengagement of the latch.

11. In a tool for forming taper threads, the combination of a tool body; means, comprising a cutter movably mounted on the body, for cutting a thread when the tool body and the work to be threaded are given relative rotational and axial movements; slides mounted on the tool body, one being adapted to engage the work and be held against axial movement relative to the work during the thread-cutting operation and the other being adapted to have such movement; a cam connection between the slide last referred to and the cutter to provide for movement of the cutter relative to the work when the said slide moves relative to the tool body; means for adjusting on lines parallel to the tool axis that part of the slide having a cam connection with the cutter to vary the radial position of the cutter and adapt it to cut threads of different diameters; means for operatively connecting the two slides comprising a movable connecting part adapted when moved in one direction to transmit relative movement between the work-engaging slide and the tool body to the other slide to effect gradual retraction of the cutter during the thread-cutting operation and adapted by movement in another direction at the end of the thread-cutting operation to retract the cutter from engagement with the work; means comprising a spring for causing the last mentioned movement of the connecting part; means comprising a disengageable latch adapted when engaged to prevent such movement of the connecting part by the spring and when disengaged to permit such movement; and means for disengaging the latch comprising a part mounted on the work-engaging slide, said means being adjustable and adapted by its adjustment to vary the amount of the relative movement between the work-engaging slide and the tool body occurring during the thread-cutting operation before disengagement of the latch and thereby vary the length of the thread cut without affecting the radial adjustment of the cutter determining the diameter of the thread cut.

12. In a tool for forming taper threads, the combination of a tool body; means, comprising a cutter movably mounted on the body, for cutting a thread when the tool body and the work to be threaded are given relative rotational and axial movements; slides mounted on the tool body, one being adapted to engage the work and be held against axial movement relative to the work during the thread-cutting operation and the other being adapted to have such movement; a cam connection between the slide last referred to and the cutter to provide for movement of the cutter relative to the work when the said slide moves relative to the tool body; means for operatively connecting the two slides comprising a movable connecting part adapted by movement in one direction to transmit relative movement between the work-engaging slide and the tool body to the other slide to effect gradual retraction of the cutter during the thread-cutting operation and by movement in another direction at the end of the thread-cutting operation to retract the cutter from engagement with the work; means comprising a spring for causing the last mentioned movement of the connecting part; disengageable latch mechanism for preventing the last named movement of the connecting part by the spring, parts of the latch mechanism being formed with coacting cam surfaces and adapted, by their relative movement to effect disengagement of the latch, to permit prior to disengagement a limited gradual movement of the connecting part by the said spring; and means for effecting such movement of the latch part near the end of the thread-cutting operation.

13. In a tool for forming taper threads, the combination of a tool body; means, comprising a cutter movably mounted on the body, for cutting a thread when the tool body and the work to be threaded are given relative rotational and axial movements; slides mounted on the tool body, one being adapted to engage the work and be held against axial movement relative to the work during the thread-cutting operation and the other being adapted to have such movement; a cam connection between the slide last referred to and the cutter for retraction of the cutter relative to the work when the said slide moves relative to the tool body; means for adjusting that part of the slide having the cam connection with the cutter to vary the radial position of the cutter and thereby adapt it to cut threads of different diameters; devices forming an operative connection between the two slides and operable by relative axial movement of the tool body and the work gradually to move the slide part having the cam connection with the cutter to effect gradual retraction of the cutter relative to the work during the thread-forming operation and mechanism operable at the end of the thread-forming operation rapidly to further retract the cutter, said mechanism being adjustable independently of the cutter and adapted by its adjustment to vary the point in the relative movement between the tool body and the work at which the cutter is rapidly retracted and thereby correspondingly vary the length of the thread cut.

14. In a tool for forming taper threads, the combination of a tool body; means, comprising a cutter movably mounted on the body, for cutting a thread when the tool body and the work to be threaded are given relative rotational and axial movements; slides mounted on the tool body, one being adapted to engage the work and be held against axial movement relative to the work during the thread-cutting operation and the other being adapted to have such movement; a cam connection between the slide last referred to and the cutter for retraction of the cutter relative to the work when the said slide moves relative to the tool body; means for adjusting that part of the slide having the cam connection with the cutter to vary the radial position of the cutter and thereby adapt it to cut threads of different diameters; devices forming an operative connection between the two slides and operable by relative axial movement of the tool body and the work gradually to move the slide part having the cam connection with the cutter to effect gradual retraction of the cutter relative to the work during the thread-forming operation; and mechanism operable at the end of the thread-forming operation rapidly to further retract the cutter, said mechanism comprising a movable operative abutment for the devices forming the operative connection between the two slides, a latch device adapted to oppose movement of the abutment during the gradual retraction of the cutter, means comprising a spring for moving the abutment when the latch is disengaged to effect the rapid retraction of the cutter, and means whereby the movement of the work-engaging slide relative to the tool body disengages the latch at the end of the gradual retraction of the cutter, the last named means being adjustable to vary the length of the thread cut.

WILLIAM L. BENNINGHOFF.